(12) United States Patent
Wang et al.

(10) Patent No.: US 12,043,139 B2
(45) Date of Patent: Jul. 23, 2024

(54) LOW-VOLTAGE POWER TRANSMISSION SYSTEM, DCDC CONVERTER, CONTROL METHOD, DEVICE, AND MEDIUM

(71) Applicant: Contemporary Amperex Technology Co., Limited, Ningde (CN)

(72) Inventors: Xiao Wang, Ningde (CN); Zhimin Dan, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 458 days.

(21) Appl. No.: 17/566,718

(22) Filed: Dec. 31, 2021

(65) Prior Publication Data

US 2022/0118879 A1    Apr. 21, 2022

Related U.S. Application Data

(63) Continuation of application No. PCT/CN2021/081298, filed on Mar. 17, 2021.

(30) Foreign Application Priority Data

Jun. 30, 2020  (CN) .......................... 202010615440.3

(51) Int. Cl.
*B60L 58/12*    (2019.01)
*B60L 53/22*    (2019.01)
*H01M 10/42*   (2006.01)

(52) U.S. Cl.
CPC ............... *B60L 58/12* (2019.02); *B60L 53/22* (2019.02); *H01M 10/425* (2013.01);
(Continued)

(58) Field of Classification Search
CPC ...... B60L 58/12; B60L 53/33; B60L 2210/10; B60L 2240/547; H01M 10/425; H01M 2010/4271; H01M 2220/20
(Continued)

(56) References Cited

U.S. PATENT DOCUMENTS

2015/0329001 A1* 11/2015 Eifert .................. H02J 7/34
                                                    320/109
2018/0208066 A1*  7/2018 Rao ................... H02J 7/0036

FOREIGN PATENT DOCUMENTS

CN    110626206 A    12/2019
CN    110641284 A     1/2020
(Continued)

OTHER PUBLICATIONS

The First Office Action for JP Application No. 2022-542169, dated Mar. 27, 2023, 8 pages.
(Continued)

*Primary Examiner* — Nathaniel R Pelton
(74) *Attorney, Agent, or Firm* — East IP P.C.

(57) ABSTRACT

The embodiments of the present application provide a low-voltage power transmission system, a DCDC converter and a control method, a device and a medium, relating to the field of battery power. The control method includes: acquiring a charging signal; acquiring a vehicle start signal; acquiring an enabling signal; when each of the charging signal, the vehicle activating start signal, and the enabling signal is at a low level, and no communication message sent by a battery management system (BMS) is received, determining that a vehicle is in a power-off state and enters a sleep mode; when a duration of the sleep mode reaches a preset duration, performing self-awakening, and outputting, to the BMS, an awakening signal for awakening the BMS and making the BMS enter a working mode.

13 Claims, 5 Drawing Sheets

(52) U.S. Cl.
CPC ..... *B60L 2210/10* (2013.01); *B60L 2240/547* (2013.01); *H01M 2010/4271* (2013.01); *H01M 2220/20* (2013.01)

(58) Field of Classification Search
USPC .......................................................... 320/109
See application file for complete search history.

(56) References Cited

FOREIGN PATENT DOCUMENTS

| CN | 110722989 A | 1/2020 |
|---|---|---|
| CN | 110803025 A | 2/2020 |
| CN | 110861530 A | 3/2020 |
| CN | 111032415 A | 4/2020 |
| JP | 2017093226 A | 5/2017 |
| JP | 2018113814 A | 7/2018 |
| JP | 2019170147 A | 10/2019 |
| KR | 1020120094303 A | 8/2012 |
| WO | 2011099116 A1 | 8/2011 |
| WO | 2012053084 A1 | 4/2012 |
| WO | 2015086931 A1 | 6/2015 |
| WO | 2017197832 A1 | 11/2017 |

OTHER PUBLICATIONS

The Second Office Action for JP Application No. 2022-542169, dated Oct. 4, 2023, 8 pages.
The International search report for PCT Application No. PCT/CN2021/081298, dated Apr. 20, 2021, 14 pages.
The extended European search report for European Application No. 21830377.4, dated Aug. 31, 2022, 10 pages.
The First Office Action for CN Application No. 202010615440.3, dated May 26, 2023, 11 pages.
The First Office Action for KR Application No. 10-2022-7023434, dated Nov. 24, 2023, 17 pages.

\* cited by examiner

LOW-VOLTAGE POWER TRANSMISSION SYSTEM, DCDC CONVERTER, CONTROL METHOD, DEVICE, AND MEDIUM

CROSS-REFERENCE TO RELATED APPLICATIONS

This application is a continuation of International Application No. PCT/CN2021/081298, filed on Mar. 17, 2021, which claims priority to Chinese Patent Application No. 202010615440.3, filed on Jun. 30, 2020, both of which are hereby incorporated by reference in their entireties.

TECHNICAL FIELD

This application relates to the field of battery technology, and in particular to a low-voltage power transmission system, a low-voltage power transmission system, a DCDC converter, and a control method, a device, and a medium.

BACKGROUND

With the development of new energy, it has been adopted as power sources in more and more fields. Batteries are widely used in new energy vehicles, consumer electronics, and energy storage systems due to their advantages of high energy density, cycle chargeability, high safety, and being environmental friendly.

With the development of new energy, battery safety issues have gradually attracted public attention. However, at present, the battery pack cannot be monitored after the vehicle is powered off, so that the safety of the vehicle cannot be guaranteed after it is powered off, especially the safety issues such as battery fire and explosion cannot be prevented in time.

SUMMARY

The low-voltage power transmission system, the DCDC converter, the control method, the device, and the medium according to the embodiments of the present application can improve the safety of the battery.

In a first aspect, an embodiment of the present application provides a control method applied to a DCDC converter, the control method including:
  acquiring a charging signal;
  acquiring a vehicle start signal;
  acquiring an enabling signal;
  when each of the charging signal, the vehicle activating start signal, and the enabling signal is at a low level, and no communication message sent by a battery management system (BMS) is received, determining that a vehicle is in a power-off state and enters a sleep mode;
  when a duration of the sleep mode reaches a preset duration, performing self-awakening, and outputting, to the BMS, an awakening signal for awakening the BMS and making the BMS enter a working mode.

In the control method of the DCDC converter according to the embodiments of the present application, when each of the charging signal, the vehicle start signal, and the enable signal is at a low level and no communication message sent by the BMS is received, it can be determined that the vehicle is in a power-off state and enters the sleep mode. When the duration of the sleep mode reaches the preset duration, the self-awakening is performed, and the awakening signal for awakening the BMS and making the BMS enter the working mode is outputted to the BMS. Therefore, the DCDC converter can be used to awaken the battery management system for monitoring the battery pack, so that the safety state of the vehicle can be monitored using the battery management system when the vehicle is powered off, which improves the safety of the battery pack.

In some embodiments, after the when a duration of the sleep mode reaches a preset duration, performing self-awakening, the control method further includes:
  outputting a first power signal for supplying power to the BMS.

In the embodiments of the present application, after the self-awakening of the DCDC converter, the BMS can be powered by the first power signal, so that the working mode of the BMS can be supported.

In some embodiments, the communication message includes a first communication message allowing output from the DCDC converter and a second communication message prohibiting output from the DCDC converter, and the method further includes:
  under a condition that the charging signal is at a high level, when the first communication message is received or the communication message is not received, determining that the vehicle is in a charging state.

In the embodiments, it can be accurately determined that the vehicle is in the charging state on the basis of the communication message.

In some embodiments, after the determining that the vehicle is in a charging state, the method further includes:
  outputting a second power signal determined according to power demand of a target power consuming module;
  where when a low-voltage power supply loop including a low-voltage power supply and the DCDC converter is turned off, the DCDC converter supplies power to the target power consuming module through the second power signal, the target power consuming module includes a low-voltage power consuming component, and the low-voltage power consuming component includes the BMS;
  where under a condition that the low-voltage power supply loop is turned on, when an output voltage of the low-voltage power supply is greater than an output voltage of the DCDC converter, the power demand of the target power consuming module is zero and the second power signal is equal to zero, and when the output voltage of the low-voltage power supply is less than or equal to the output voltage of the DCDC converter, the DCDC converter supplies power to the target power consuming module through the second power signal and the target power consuming module includes the low-voltage power supply and the low-voltage power consuming component.

In the embodiments, when the vehicle is in the charging state, the target power consuming module can be powered according to the ON/OFF state of the low-voltage power supply loop and the comparison between output voltage of the low-voltage power supply and the output voltage of the DCDC converter. Therefore, the flexibility of the control strategy is improved.

In some embodiments, the communication message includes a first communication message allowing output from the DCDC converter and a second communication message prohibiting output from the DCDC converter, and the method further includes:
  when the charging signal is at a low level, the vehicle start signal is at a high level, and the first communication message is received, or when the charging signal is at a low level, the vehicle start signal and the enable signal are at a high level, and the communication message is not received, determining that the vehicle is in a traveling state.

In the embodiments, the state of the vehicle can be accurately determined based on the charging signal, the vehicle start signal, and the first communication message.

In some embodiments, after the determining that the vehicle is in a traveling state, the method further includes:
outputting a third power signal determined according to power demand of a target power consuming module;
where when a low-voltage power supply loop including a low-voltage power supply and the DCDC converter is turned off, the DCDC converter supplies power to the target power consuming module through the third power signal, the target power consuming module includes a low-voltage power consuming component, and the low-voltage power consuming component includes the BMS;
where under a condition that the low-voltage power supply loop is turned on, when an output voltage of the low-voltage power supply is greater than an output voltage of the DCDC converter, the power demand of the target power consuming module is zero and the third power signal is equal to zero, and when the output voltage of the low-voltage power supply is less than or equal to the output voltage of the DCDC converter, the DCDC converter supplies power to the target power consuming module through the third power signal and the target power consuming module includes the low-voltage power supply and the low-voltage power consuming component.

In the embodiments, when the vehicle is in the traveling state, the target power consuming module can be powered according to the ON/OFF state of the low-voltage power supply loop and the comparison between output voltage of the low-voltage power supply and the output voltage of the DCDC converter. Therefore, the flexibility of the control strategy is improved.

In some embodiments, the communication message includes a first communication message allowing output from the DCDC converter and a second communication message prohibiting output from the DCDC converter, and the method further includes:
when the first communication message is received and the charging signal and the vehicle start signal are at a high level, or when the second communication message is received, determining that the vehicle is in a standby state.

In the embodiments, it can be accurately determined whether the vehicle is in the standby state on the basis of the communication message, the charging signal, and the vehicle start signal.

In some embodiments, the communication message includes a first communication message allowing output from the DCDC converter and a second communication message prohibiting output from the DCDC converter, and the method further includes:
when the first communication message is received and the charging signal and the vehicle start signal are at a low level, determining that the vehicle is in a target state in which the vehicle is waiting to enter the sleep mode.

In the embodiments, it can be accurately determined whether the vehicle is in the target state on the basis of the communication message.

In some embodiments, when no communication message sent by the BMS is received, the charging signal and the vehicle start signal are at a low level, and the enabling signal is at a high level, determining that the vehicle is in a fault state.

In the embodiments, it can be accurately determined whether the vehicle is in the fault state on the basis of the communication message, the charging signal, the vehicle start signal, and the enabling signal.

In a second aspect, the embodiments of the present application provide a DCDC converter including:
a parameter acquiring module configured to acquire a charging signal, a vehicle start signal, and an enabling signal;
a control module configured to determine that a vehicle is in a power-off state and enters a sleep mode when each of the charging signal, the vehicle start signal, and the enabling signal is at a low level, and no communication message sent by a battery management system (BMS) is received;
a self-awakening module configured to perform self-awakening and output, to the BMS, an awakening signal for awakening the BMS and making the BMS enter a working mode, when a duration of the sleep mode reaches a preset duration.

According to the DCDC converter in the embodiments of the present application, when each of the charging signal, the vehicle start signal, and the enable signal is at a low level and no communication message sent by the BMS is received, it can be determined that the vehicle is in a power-off state and enters the sleep mode. When the duration of the sleep mode reaches the preset duration, the self-awakening is performed, and the awakening signal for awakening the BMS and making the BMS enter the working mode is outputted to the BMS.

Therefore, the DCDC converter can be used to awaken the battery management system for monitoring the battery pack, so that the safety state of the vehicle can be monitored using the battery management system even when the vehicle is powered off, which improves the safety of the battery pack.

In some embodiments, the DCDC converter includes a phase-shifted full-bridge unit.

With the phase-shifted full-bridge unit in the embodiments, the conversion efficiency of the DCDC converter can be improved.

In a third aspect, the embodiments of the present application provide a low-voltage power transmission system including:
a battery management system, and the DCDC converter provided by the second aspect or any one of the optional implementations of the second aspect.

According to the low-voltage power transmission system in the embodiments of the present application, when each of the charging signal, the vehicle start signal, and the enable signal is at a low level and no communication message sent by the BMS is received, it can be determined that the vehicle is in a power-off state and enters the sleep mode. When the duration of the sleep mode reaches the preset duration, the self-awakening is performed, and the awakening signal for awakening the BMS and making the BMS enter the working mode is outputted to the BMS. Therefore, the DCDC converter can be used to awaken the battery management system for monitoring the battery pack, so that the safety state of the vehicle can be monitored using the battery management system when the vehicle is powered off, which improves the safety of the battery pack.

In some embodiments, the low-voltage power transmission system further includes: a low-voltage power supply connected to the DCDC converter and the battery management system each through a low-voltage power supply loop.

In the embodiments, by providing the low-voltage power supply, a more flexible power utilization strategy can be realized.

In some embodiments, the low-voltage power transmission system further includes:
  a state parameter transmitting apparatus configured to acquire a state parameter of a battery pack from the battery management system, and transmit the state parameter of the battery pack to a remote monitoring platform.

In the embodiments, the state parameter of the battery pack can be transmitted to the remote monitoring platform by the state parameter transmitting apparatus, so that it is convenient for relevant operators to monitor the state parameter of the battery through the remote monitoring platform.

In a fourth aspect, there is provided a control device including
  a memory configured to store a program; and
  a processor configured to execute the program stored in the memory to perform the control method provided by the first aspect or any one of the optional implementations of the first aspect.

According to the control device in the embodiments of the present application, when each of the charging signal, the vehicle start signal, and the enable signal is at a low level and no communication message sent by the BMS is received, it can be determined that the vehicle is in a power-off state and enters the sleep mode. When the duration of the sleep mode reaches the preset duration, the self-awakening is performed, and the awakening signal for awakening the BMS and making the BMS enter the working mode is outputted to the BMS. Therefore, the DCDC converter can be used to awaken the battery management system for monitoring the battery pack, so that the safety state of the vehicle can be monitored using the battery management system when the vehicle is powered off, which improves the safety of the battery pack.

In a fifth aspect, a computer storage medium is provided, where the computer storage medium has computer program instructions stored thereon, and the computer program instructions, when being executed by a processor, implement the control method provided by the first aspect or any one of the optional implementations of the first aspect.

According to the medium in the embodiments of the present application, when each of the charging signal, the vehicle start signal, and the enable signal is at a low level and no communication message sent by the BMS is received, it can be determined that the vehicle is in a power-off state and enters the sleep mode. When the duration of the sleep mode reaches the preset duration, the self-awakening is performed, and the awakening signal for awakening the BMS and making the BMS enter the working mode is outputted to the BMS. Therefore, the DCDC converter can be used to awaken the battery management system for monitoring the battery pack, so that the safety state of the vehicle can be monitored using the battery management system when the vehicle is powered off, which improves the safety of the battery pack.

BRIEF DESCRIPTION OF THE DRAWINGS

The drawings necessary for explaining embodiments are introduced briefly below to illustrate the technical solutions of the embodiments of the present application more clearly. Apparently, the drawings described below are merely some embodiments of the present application. Other figures can be obtained by those with ordinary skill in the art from those drawings without any creative work.

Figure 1:
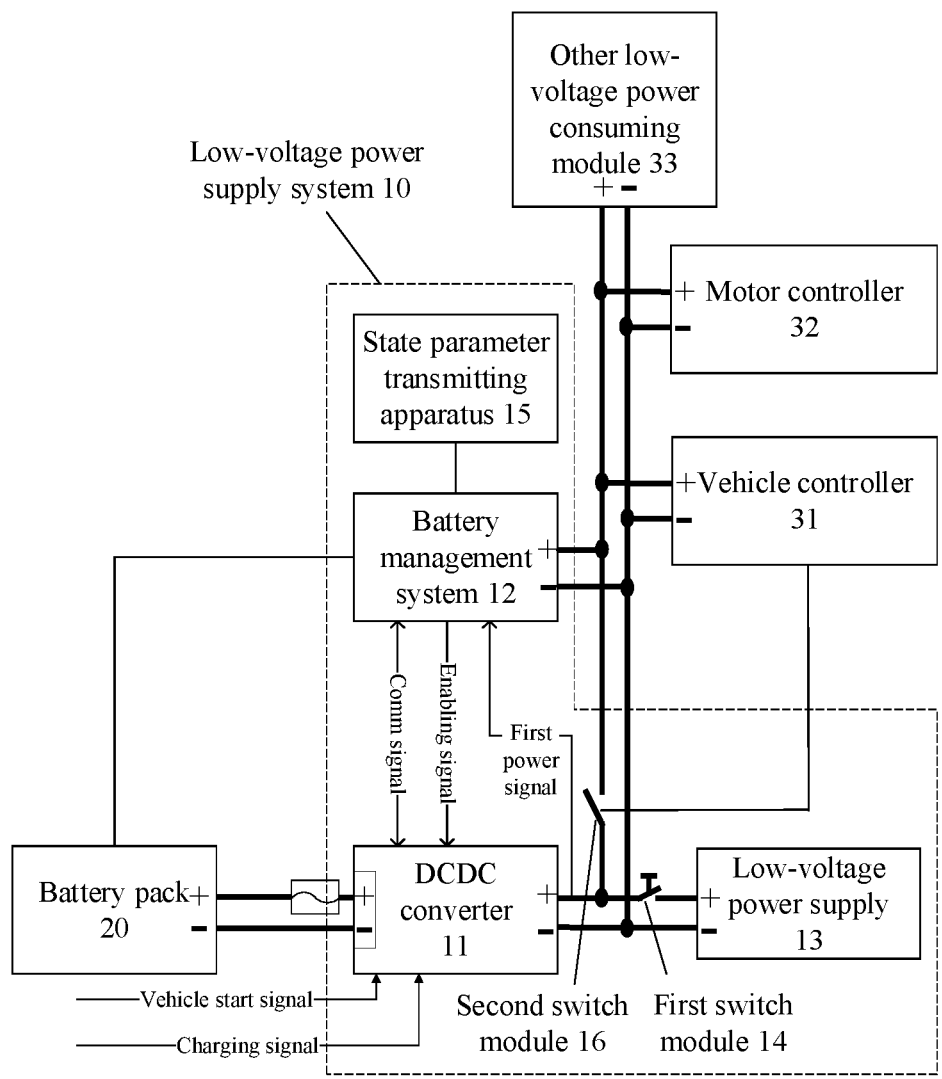
FIG. 1 is a schematic structural diagram of a low-voltage power transmission system according to an embodiment of the present application.

The drawings are not drawn to actual scale.

DETAILED DESCRIPTION

Features and exemplary embodiments of various aspects of the present application will be described in detail below. In order to make the objects, technical solutions and advantages of the present application clearer, the present application is further described in detail below with reference to the drawings and embodiments. It should be understood that, the specific embodiments described herein are only for illustration of the present application, and are not for limiting the present application. For those skilled in the art, the present application can be implemented without some of those specific details. The following description of the embodiments is only for providing an understanding of the present application by showing examples of the present application.

It is to be noted that relational terms such as first, second, and the like are used herein solely to distinguish one entity or operation from another entity or operation without necessarily requiring or implying any actual such relationship or order between such entities or operations. Moreover, the terms "include", "including", or any other variation thereof, are intended to cover a non-exclusive inclusion, such that a process, method, article or device that includes a series of elements does not include only those elements but may include other elements not explicitly listed or inherent to such process, method, article or device. An element preceded by "include . . . " does not, without more constraints, preclude the existence of additional identical elements in the process, method, article or device that includes the element.

A power supply in an electric vehicle may include a high-voltage battery pack and a low-voltage power supply. The high-voltage battery pack may include at least one battery module or at least one battery cell, which is not limited here. The high-voltage battery pack may be used as the power source of the electric vehicle to supply power to a motor. The low-voltage power supply may provide 12V or 24V low-voltage power for low-voltage power consuming components in the vehicle. In an example, the low-voltage power supply may be a lead-acid battery. The low-voltage power consuming components may be instrument controllers, relays, air pump controllers and the like in the vehicle that need to be driven by low-voltage.

In practical use, the electric vehicle may be in different use states, for example, a traveling state, a charging state, or a power-off state. When the vehicle is in a driving scene, the electric vehicle is in the traveling state. At this time, the vehicle needs to be in a power-on state. In other words, the low-voltage power consuming components of the vehicle need to be energized. At this time, it is required to use a low-voltage power supply or a direct current-direct current (Direct Current-Direct Current, DCDC) converter to supply power to the low-voltage power consuming components. In a scene where the vehicle is being charged, if low-voltage power consuming components in the vehicle are all powered off, the vehicle is in a power-off and charging state. If the low-voltage power consuming components in the vehicle are powered on, the vehicle is in a power-on and charging state. In addition, in a vehicle braking and parking scene, after the vehicle comes to a complete stop and the low-voltage power consuming components in the vehicle are all powered off, the vehicle is in a vehicle power-off state.

Currently, when the vehicle is in the power-on state, the state of the battery pack may be monitored using a battery management system. After the vehicle is powered off, the battery management system will also be powered off, and the state of the battery pack cannot be monitored. If the state of the battery pack is abnormal at this time, the abnormality cannot be discovered in time and corrective measures cannot be taken in time, so that the safety of the battery pack cannot be ensured.

Therefore, there is a lack of a technical solution that can awaken a battery management system (battery Management System, BMS) to make the BMS enter a working mode when the vehicle is powered off so that the battery safety is ensured.

FIG. 1 is a schematic structural diagram of a low-voltage power transmission system according to an embodiment of the present application. As shown in FIG. 1, the low-voltage power transmission system 10 includes a DCDC converter 11 and a battery management system 12.

Regarding the DCDC converter 11, it may convert high-voltage power from a battery pack 20 into low-voltage power, and output the converted low-voltage power to a target low-voltage power consuming component.

When the target vehicle is in a power-off state, the DCDC converter 11 may perform self-awakening through a timer and awaken the BMS 12. Therefore, the battery pack 20 may be monitored using the battery management system 12 even when the target vehicle is in a power-off state. In an example, the DCDC converter 11 may include a timer. When the timer determines that a preset duration is reached, the DCDC converter 11 performs the self-awakening, sends an awakening signal to the BMS 12 after the self-awakening, and outputs low-voltage power to supply power the BMS 12.

Regarding the BMS 12, it can realize the function of monitoring the battery pack 20. For example, the BMS 12 may collect battery pack state data such as a temperature of a single battery cell in the battery pack 20 and a voltage of a single battery cell in the battery pack 20, and determine whether the state of the battery pack 20 is abnormal on the basis of the battery pack state data. In addition, the BMS 12 can realize the function of controlling the DCDC converter 11.

It should be noted that BMS 12 may be specifically implemented as a domain controller. The domain controller represents an electronic component with a vehicle control unit (Vehicle control unit, VCU) function, a motor control unit (Motor Control Unit, MCU) function, and a battery management system (Battery Management System, BMS) function integrated therein. The domain controller may also have functions of other modules integrated therein, which will not be limited here.

In some embodiments, with continued reference to FIG. 1, the low-voltage power transmission system 10 may further include a low-voltage power supply 13. In an example, the low-voltage power supply 13 may be a power supply device that can output a voltage of 12V or 24V, such as a lead-acid battery, which will not be specifically limited.

In an example, a first switch module 14 is provided in a low-voltage power supply loop where the low-voltage power supply 13 is located. When the first switch module 14 is turned on, the low-voltage power supply loop between the low-voltage power supply 13 and the low-voltage power consuming modules is turned on, and the low-voltage power supply 13 can supply power to the low-voltage power modules. At the same time, a low-voltage power supply loop between the low-voltage power supply 13 and the DCDC converter 11 is turned on, and the DCDC converter 11 can supplement power of the low-voltage power supply 13. In an example, the first switch module 14 may be specifically implemented as a manual switch.

It should be noted that, the position of the first switch module 14 may be set in other positions of the low-voltage power supply loop according to actual requirements or specific working scenarios, for example, the first switch module 14 may be set on a power supply loop where the DCDC converter 11 is located, which will not be limited here.

In some embodiments, with continued reference to FIG. 1, the low-voltage power transmission system 10 may further include a state parameter transmitting apparatus 15. After a state parameter of the battery pack 20 is acquired by the battery management system 12, the battery management system 12 may transmit the state parameter of the battery pack 20 to a remote monitoring terminal through the state parameter transmitting apparatus 15. The state parameter of the battery pack 20 is for indicating the electrical characteristics states of the battery pack 20. For example, the state parameters of the battery pack 20 may be voltage parameters of respective single battery cells in the battery pack 20 and/or temperature parameters of respective single battery cells in the battery pack 20. In an example, the state parameter transmitting apparatus 15 and the remote monitoring terminal may communicate wirelessly, for example, using a data transmission network such as the global system for mobile communications (Global System for Mobile Communications, GSM) network or the 4th generation mobile communication technology (the 4th generation mobile communication technology, 4G), or a wireless local area network such as wireless fidelity (Wireless Fidelity, Wi-Fi), which will not be particularly limited here.

In some embodiments, the low-voltage power transmission system 10 may further include a second switch module 16 arranged in the low-voltage power supply loop. Specifically, the second switch module 16 may be arranged on a low-voltage positive electrode power transmission line. The position of the second switch module 16 may be set according to specific scenarios and actual requirements, which will not be limited here. In an example, with continued reference to FIG. 1, if a low-voltage power supply branch of each low-voltage power consuming component is connected to a same low-voltage power supply main line, then the second switch module 16 may be arranged on the low-voltage power supply main line. When the second switch module 16 is turned on, the low-voltage power consuming components may be powered.

In addition, the low-voltage power supply branch may be connected to the low-voltage power supply loop between the DCDC converter 11 and the low-voltage power supply 13. The connecting point where the low-voltage power supply branch may be connected to the low-voltage power supply loop between the DCDC converter 11 and the low-voltage power supply 13 may be referred to as a first connecting point. The first switch module 14 may be arranged between the first connecting point and the low-voltage power supply 13. Therefore, when the target vehicle is in the power-off state, the second switch module 16 may be selectively turned on to supply power to the low-voltage power consuming modules, and the first switch module 14 may be turned on to supplement the power of the low-voltage power supply 13. This makes the low-voltage power transmission system 10 more flexible as a whole.

In addition, the second switch module 16 may be turned on or off under the control by a vehicle controller 31. In an example, an enabling terminal of the vehicle controller 31 outputs a control signal for controlling the second switch module 16.

With the low-voltage power transmission system 10 according to this embodiment of the present application, the battery pack state of the vehicle in a power-off state can be monitored by proving only a DCDC converter 11 without providing a power distributing module. While the safety of the battery pack can be ensured, the topology and connection relationship of the low-voltage power transmission system can be simplified, and the wiring harness used by the low-voltage power transmission system can be reduced.

After the introduction of the low-voltage power transmission system 10, the DCDC converter 11 will be specifically described in the following sections of the embodiments of the present application. For a thorough understanding of the DCDC converter 11, the control method, the apparatus, the device, and the medium according to the embodiments of the present application will be described in detail below with reference to the drawings. It should be noted that these embodiments are not used to limit the scope of the disclosure of the present application.

Figure 2:
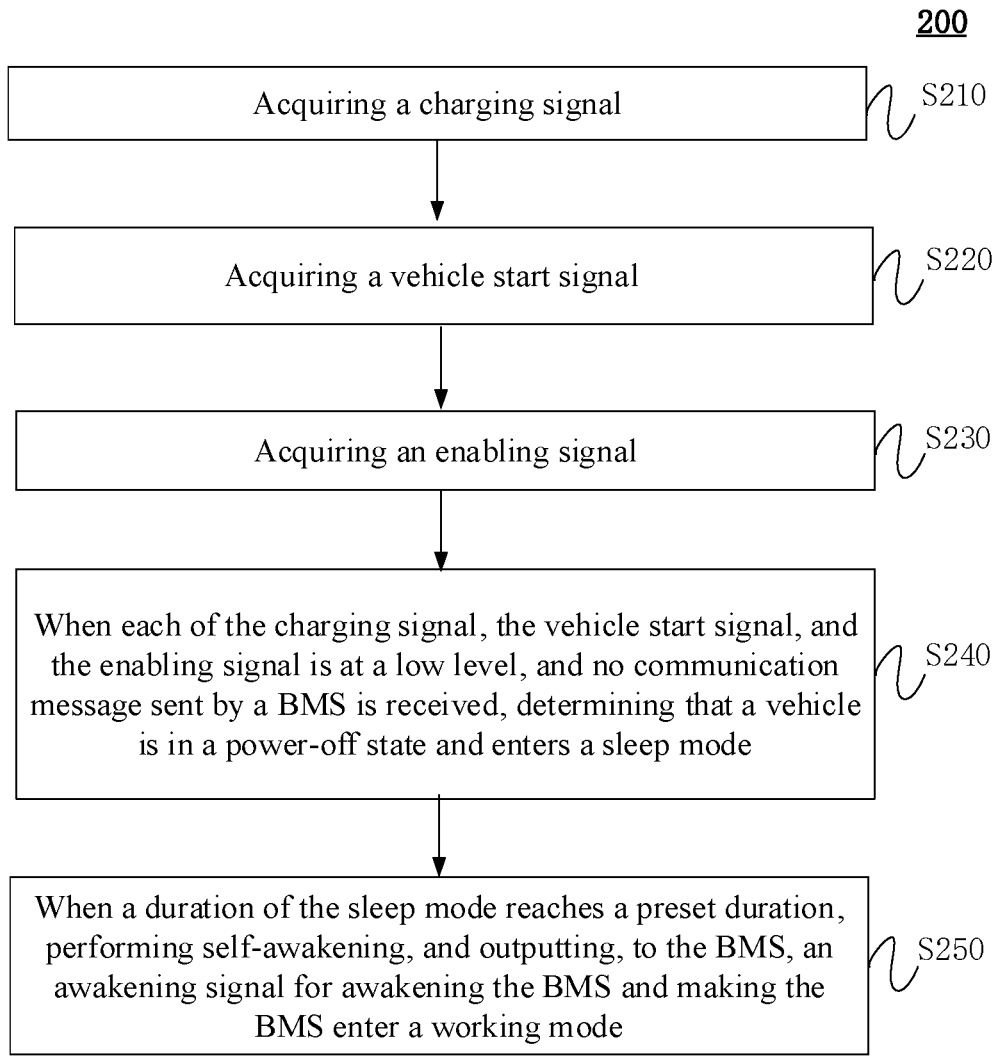
FIG. 2 is a schematic flowchart of a control method according to an embodiment of the present application.

FIG. 2 is a schematic flowchart of a control method according to an embodiment of the present application. As shown in FIG. 2, the control method 200 according to this embodiments of the present application includes steps S110-S150.

At S110, a charging signal is acquired.

The charging signal is for indicating whether the vehicle is being charged. For example, the above charging awaking signal may be referred to as an A+ signal. Specifically, if a 12V or 24V low-voltage signal is inputted from an external charging power source such as a charging gun, the charging signal is at a high level, and otherwise the charging signal is at a low level.

At S120, a vehicle start signal is acquired.

The vehicle start signal is for indicating whether the vehicle is powered on. If the vehicle start signal is at a high level, it is determined that the vehicle is powered on. Instead, if the vehicle start signal is at a low level, it is determined that the vehicle is not powered on. In an example, the vehicle start signal may be determined according to a gear position of an ignition switch of the target vehicle. For example, if the ignition switch of the target vehicle has been switched to a "key on" position, the vehicle start signal is at a high level. Otherwise, the vehicle start signal is at a low level. Accordingly, the vehicle start signal may be referred to as a key on signal.

At S130, an enabling signal is acquired.

The enabling signal may be a signal sent by the BMS. The enabling signal can be called an ENABLE signal. If the enabling signal is at a high level, it indicates that output from the DCDC converter is allowed. In some embodiments, the enabling signal (ENABLE signal) may be received through an enabling port (ENABLE port) of the DCDC converter 11.

In addition, in addition to sending the enable signal to the DCDC converter 11, the BMS 12 may perform communication through the communication line between the BMS 12 and the DCDC converter 11. The communication line includes a controller area network (Controller Area Network, CAN) bus or a serial communication line. Alternatively, the communication line may be a wireless communication line, which is not specifically limited here. For example, if the communication line between the BMS 12 and the DCDC converter 11 is a CAN bus, the BMS 12 may send a CAN message to the DCDC converter 11.

Specifically, under normal conditions, the information indicated by the CAN message needs to be consistent with the information indicated by the ENABLE signal. In an example, if the CAN message indicates that the output from the DCDC converter 11 is allowed, the ENABLE signal may be a high-level signal, and if the CAN message indicates that that the output from the DCDC converter is prohibited, the ENABLE signal may be a low-level signal. In an example, if the information indicated by the CAN message is inconsistent with that indicated by the ENABLE signal, then the CAN message may be taken as the main information source, and the fault is reported. If the CAN message is not received, that is, CANLOSS, the ENABLE signal may be used for the determination of the BMS 12 command.

It should also be noted that, the embodiments of the present application does not limit the execution sequence of S110, S120, and S130, and these steps may be executed synchronously or asynchronously.

At S140, if each of the charging signal, the vehicle start signal, and the enabling signal is at a low level and no communication message sent by the BMS 12 is received, it is determined that the vehicle is in a power-off state and enters a sleep mode.

At S150, when a duration of the sleep mode reaches a preset duration, self-awakening is performed, and an awaking signal for awakening the BMS and making the BMS enter a working mode is outputted to the BMS.

That is to say, when the vehicle is in the sleep mode and the duration of the sleep mode reaches a preset duration, the self-awakening is performed on the DCDC converter 11 and the BMS 12 is awakened. It may be determined by a timer that the duration of the sleep mode reaches the preset duration.

Regarding the preset duration, in some embodiments, it may be set by the BMS 12 according to specific working scenarios and work needs. Accordingly, duration information sent by the BMS 12 that indicates the preset duration may be received. The preset duration may be adjusted according to the received duration information.

In some embodiments, if the BMS 12 is in a continuous power-off mode because the target vehicle is in the power-off state, when the target vehicle is in the power-off state, the safety of the battery pack 20 may be affected because the BMS 12 cannot monitor the state parameter of the battery pack in real time. Therefore, in order to ensure the safety of the battery pack 20, when the target vehicle is in the power-off state, the DCDC converter 11 may be awakened periodically, thereby awakening the BMS 12 periodically. In this situation, after being awaken for a period of time, the BMS 12 re-enters the power-off mode from the working mode.

In an example, in order to realize the periodic self-awakening of the DCDC converter 11, after the DCDC converter 11 outputs the awakening signal to the BMS 12, the recorded time length may be cleared and the timing may be restarted. In this situation, the preset duration needs to be longer than a single duration in which the BMS 12 is awakened. Alternatively, after the BMS 12 re-enters the power-off mode, it will send a power-off prompt signal to the DCDC converter 11. After the DCDC converter 11 receives the power-off prompt signal, it may clear the recorded time length and restart the timing.

Further, for the awakening signal, the awakening signal may be transmitted through a communication line. In an example, the awakening signal may be loaded in the CAN message.

In addition, it should be noted that, after the BMS 12 enters the working mode, the BMS 12 may monitor the state parameters of the battery pack 20. The state parameter of the battery pack 20 is for indicating the state characteristics of the battery pack. For example, the state parameter of the battery pack 20 may be voltage parameters of respective single battery cells in the battery pack 20 and/or temperature parameters of the respective single battery cells in the battery pack 20, a pressure parameter of the battery pack, a smoke parameter in the battery pack, and/or the like, which will not be specifically limited here.

In some embodiments, because the BMS 12 is not powered on before being awakened, in order to successfully awaken the BMS 12, it is required to provide the BMS 12 with low-voltage power at the same time when awakening the BMS 12.

Accordingly, after the self-awakening is performed under a condition that the duration of the sleep mode reaches the preset duration, the method further includes outputting a first power signal for supplying power to the BMS 12. In an example, the DCDC converter 11 may be in a low power output mode. For example, the first power signal may be an output power, and the value of the first power signal may be equal to 300 W.

According to the low-voltage power transmission system, the DCDC converter, the control method, the device, and the medium in the embodiments of the present application, when each of the charging signal, the vehicle start signal, and the enabling signal is at a low level and no communication message sent by the BMS 12 is received, it can be determined that the vehicle is in the power-off state and enters the sleep mode, and the self-awakening is performed when the duration of the sleep mode reaches the preset duration, and the awakening signal for awakening the BMS 12 and making the BMS 12 enter the working mode is outputted to the BMS 12. Therefore, the DCDC converter 11 can be used to awaken the battery management system to monitor the battery pack, so that the BMS 12 can also be used to monitor the safety state of the vehicle after the vehicle is powered off, thereby improving the safety of the battery pack 20.

According to the embodiments of the present application, in addition to using the above four signals to determine the power-off state, a charging state may also be determined. The charging state will be explained in the following section in detail.

Regarding the Charging State

In some embodiments, if the communication message includes a first communication message allowing output from the DCDC converter and a second communication message prohibiting output from the DCDC converter, the method 200 further includes the following step.

Under a condition that the charging signal is at a high level, when the first communication message is received or the communication message is not received, determining that the vehicle is in a charging state. No communication message being received means that no first communication message and no second communication message is received.

In an example, it may be determined that the vehicle is in the charging state under the eight conditions listed in Table 1.

TABLE 1

| | CAN | A+ | KEY ON | ENABLE | Vehicle state |
|---|---|---|---|---|---|
| (1) | Output allowed | High | High | High | Charging |
| (2) | Output allowed | High | High | Low | Charging |
| (3) | Output allowed | High | Low | High | Charging |
| (4) | Output allowed | High | Low | Low | Charging |
| (5) | LOSS | High | High | High | Charging |
| (6) | LOSS | High | High | Low | Charging |
| (7) | LOSS | High | Low | High | Charging |
| (8) | LOSS | High | Low | Low | Charging |

As shown in Table 1, (1) when the CAN message indicates that the output from the DCDC converter 11 is allowed, and each of the A+ signal, the KEY ON signal, and the ENABLE signal is at a high level, it is determined that the vehicle is in the charging state; (2) when the CAN message indicates that the output from the DCDC converter 11 is allowed, the A+ signal and the KEY ON signal are at a high level, and the ENABLE signal is at a low level, it is determined that the vehicle is in the charging state; (3) when the CAN message indicates that the output from the DCDC converter 11 is allowed, the A+ signal and the ENABLE signal are at a high level, and the KEY ON signal is at a low level, it is determined that the vehicle is in the charging state; (4) when the CAN message indicates that the output from the DCDC converter 11 is allowed, the A+ signal is at a high level, and the KEY ON signal and the ENABLE signal are at a low level, it is determined that the vehicle is in the charging state; (5) when no CAN message is received, that is, CANLOSS, and each of the A+ signal, the KEY ON signal, and the ENABLE signal is at a high level, it is determined that the vehicle is in the charging state; (6) when CANLOSS, the A+ signal and the KEY ON signal are at a high level and the ENABLE signal is at a low level, it is determined that the vehicle is in the charging state; (7) when CANLOSS, the A+ signal and the ENABLE signal are at a high level and the KEY ON signal is at a low level, it is determined that the vehicle is in the charging state; (8) when CANLOSS, the A+ signal is at a high level and the KEY ON signal and the ENABLE signal are at a low level, it is determined that the vehicle is in the charging state.

In some embodiments, in the charging state, the DCDC converter 11 may further output a second power signal. Correspondingly, after determining that the vehicle is in the charging state, the method 200 further includes outputting the second power signal.

The second power signal is determined according to power demand of a target power consuming module. In an example, the DCDC converter 11 may output a constant voltage, for example, a voltage intensity value of the constant voltage may be 27V. However, the voltage intensity value of the second power signal may be in a range of 0-3 KW.

Specifically, there are three cases for the second power signal.

Case (1): the low-voltage power supply loop including the low-voltage power supply 13 and the DCDC converter 11 is turned off. In an example, with reference to FIG. 1, this case may specifically be where the first switch module 14 is turned off. In this situation, the DCDC converter 11 is required to supply power to the low voltage consuming component. The low-voltage power consuming component includes the BMS 12. In an example, the voltage intensity value of the second power signal may vary within the range of 300 W-3 KW.

Case (2): when the above-mentioned low-voltage power supply loop is turned on and the output voltage of the low-voltage power supply is less than or equal to the output voltage of the DCDC converter 11, the DCDC converter 11 is required to supply power to the low-voltage power supply 13 and the low-voltage power consuming components. In this situation, the target power consuming modules include the low-voltage power supply 13 and the low-voltage power consuming components.

Case (3): when the above low-voltage power supply loop is turned on and the output voltage of the low-voltage power supply is greater than the output voltage of the DCDC converter 11, the low-voltage power supply 13 meets the power demand of the target power consuming module, that is, the low-voltage power supply supplies power to the target power consuming module, and in this situation, the power demand of the target power consuming module on the DCDC converter 11 is zero, and the voltage intensity value of the second power signal is equal to zero.

In the embodiments of the present application, in addition to using the above four signals to determine the power-off state, a traveling state can also be determined. The traveling state will be explained in the following section in detail.

Regarding the Traveling State

In some embodiments, the method 200 further includes:
under a condition that the charging signal is at a low level, the vehicle start signal is at a high level, and the first communication message is received, determining that the vehicle is in the traveling state; or, under a condition that the charging signal is at a low level, the vehicle start signal and the enable signal are at a high level, and the communication message is not received, determining that the vehicle is in the traveling state.

In an example, it can be determined that the vehicle is in the traveling state under the three conditions shown in Table 2.

TABLE 2

| | CAN | A+ | KEY ON | ENABLE | Vehicle state |
|---|---|---|---|---|---|
| (1) | Output allowed | Low | High | High | Traveling |
| (2) | Output allowed | Low | High | Low | Traveling |
| (3) | LOSS | Low | High | High | Traveling |

As shown Table 2, (1) when the CAN message indicates that the output from the DCDC converter 11 is allowed, the A+ signal is at a Low level, and the KEY ON signal and the ENABLE signal are at a high level, it is determined that the vehicle is in the traveling state;

(2) when the CAN message indicates that the output from the DCDC converter 11 is allowed, the A+ signal and the ENABLE signal are at a low level, and the KEY ON signal is at a high level, it is determined that the vehicle is in the traveling state; (3) when CANLOSS, the A+ signal is at a low level, and the KEY ON signal and the ENABLE signal are at a high level, it is determined that the vehicle is in the traveling state.

In some embodiments, after determining that the vehicle is in the traveling state, the method 200 further includes the following step:
outputting a third power signal is outputted. The content of the third power signal is similar to that of the second power signal, and will not be repeated here.

In the embodiments of the present application, in addition to using the above four signals to determine the power-off state, a standby state may also be determined. The standby state will be explained in the following section in detail.

Regarding the Standby State

In some embodiments, the method 200 further includes:
under a condition that the first communication message is received and the charging signal and the vehicle start signal are at a high level, determining that the vehicle is in the standby state; or, under a condition that the second communication message is received, determining that the vehicle is in the standby state.

In an example, it can be determined that the vehicle is in the standby state under the two conditions shown in Table 3.

TABLE 3

| CAN | A+ | KEY ON | ENABLE | Vehicle state |
|---|---|---|---|---|
| (1) Output Prohibited | High/low | High/low | High/low | Standby |
| (2) LOSS | Low | High | Low | Standby |

As shown in Table 3, (1) the CAN message indicates that the output from the DCDC converter 11 is prohibited, and it can be determined that the vehicle is in the standby state regardless of the levels of the A+ signal, the KEY ON signal, and the ENABLE signal; (2) when CANLOSS, the A+ signal and the ENABLE signal are at a low level and the KEY ON signal is at a high level, it is determined that the vehicle is in the standby state.

In some embodiments, when the DCDC converter 11 is in the standby mode, its output power is 0, that is, no power is outputted. The standby mode ends when the conditions of other states are met.

In the embodiments of the present application, in addition to using the above four signals to determine the power-off state, it may also be determined that the vehicle is in a target state indicating that the vehicle is ready to enter the sleep mode. The target state will be explained in the following section in detail.

Regarding the Target State

In some embodiments, the method 200 further includes:
when the first communication message is received and the charging signal and the vehicle start signal are at a low level, determining that the vehicle is in a target state in which the vehicle is waiting to enter the sleep mode. In an example, when the vehicle is not ignited and the vehicle is not charged, the vehicle may be in the target state in which the vehicle is waiting to enter the sleep mode because the BMS 12 has not been completely powered off. In an example, when the vehicle is in the target state in which the vehicle is waiting to enter the sleep mode, the DCDC converter 11 stops output, that is, the output voltage and output power of the DCDC converter 11 may be equal to zero.

In an example, it can be determined that the vehicle is in the standby state under the two conditions shown in Table 4.

TABLE 4

| CAN | A+ | KEY ON | ENABLE | Vehicle state |
|---|---|---|---|---|
| (1) Output allowed | Low | Low | High | Target state |
| (2) Output allowed | Low | Low | Low | Target state |

As shown in Table 4, when the CAN message indicates that the output from the DCDC converter is allowed, and each of the A+ signal and the KEY ON signal is at a low level, it may be determined that the vehicle is in the target state regardless of the level of the ENABLE signal.

In the embodiments of the present application, in addition to using the above four signals to determine the power-off state, it may also be determined that the vehicle is in the fault state. The fault state will be explained in the following section in detail.

Regarding Fault State

In some embodiments, the method 200 further includes: when no communication message sent by the BMS 12 is received, the charging signal and the vehicle start signal are at a low level, and the enabling signal is at a high level, determining that the vehicle is in a fault state. In an example, since the Enable signal is at a high level in the fault state, the DCDC converter is in a self-awakening abnormal state and cannot enter the sleep state, the fault is reported to the BMS 12, and no power is outputted.

In an example, it can be determined that the vehicle is in the standby state under the two conditions shown in Table 5.

TABLE 5

| CAN | A+ | KEY ON | ENABLE | Vehicle state |
|---|---|---|---|---|
| (1) LOSS | Low | Low | High | Target state |

As shown in Table 5, when CANLSS, each of the A+ signal and KEY ON signal is at a low level and the ENABLE signal is at a high level, it can be determined that the vehicle is in the fault state.

Figure 3:
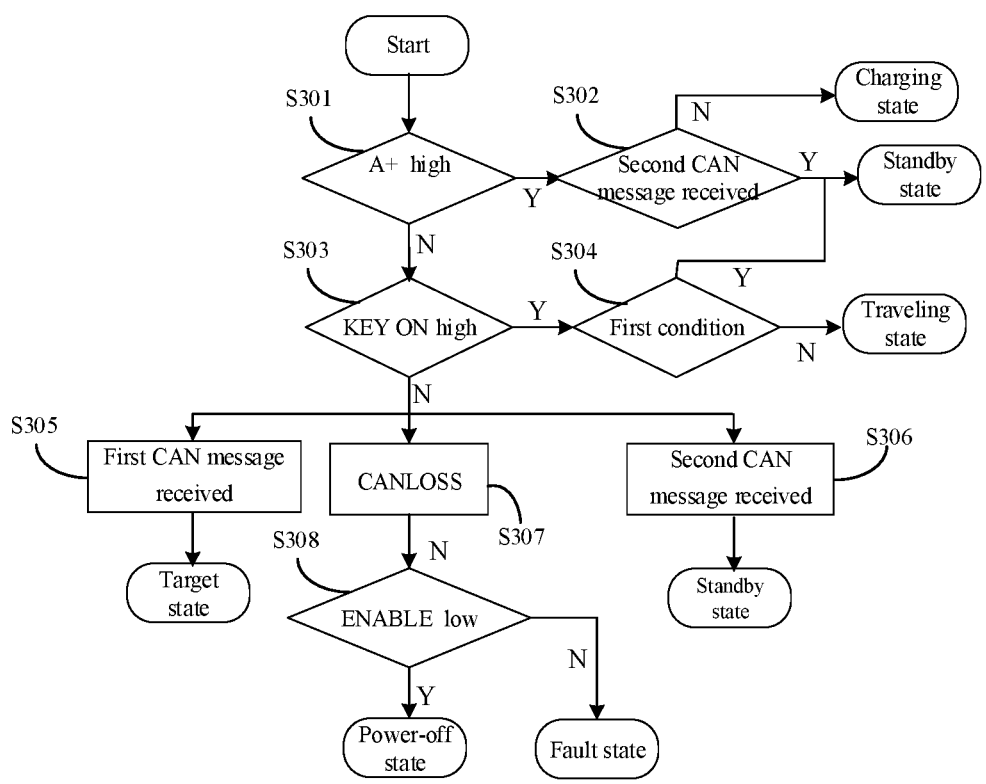
FIG. 3 is a schematic flowchart of an exemplary control method according to an embodiment of the present application.

For a thorough understanding, the embodiments of the present application further provide an exemplary control method. FIG. 3 is a schematic flowchart of an exemplary control method according to an embodiment of the present application.

At S301, it is determined whether the A+ signal is a high-level signal. If the determination result is positive, S302 is performed; if the determination result is negative, S303 is performed.

At S302, it is determined whether the second CAN message indicating that the output from the DCDC converter 11 is prohibited is received. If the determination result is positive, it is determined that the vehicle is in the standby state; if the determination result is negative, it is determined that the vehicle is in the charging state.

At S303, it is determined whether the KEY ON signal is a high-level signal. If the determination result is positive, S304 is performed; if the determination result is negative, S305, S306 or S307 is performed.

At S304, it is determined whether a first condition is met. The first condition is that the ENABLE signal is at a low level and CANLOSS, or the second CAN message is received. If the determination result is positive, it is determined that the vehicle is in the standby state; if the determination result is negative, it is determined that the vehicle is in the traveling state.

At S305, when the first CAN message is received, it is determined that the vehicle is in the target state, that is, the state of waiting to enter the power-off mode.

At S306, when the second CAN message is received, it is determined that the vehicle is in the standby state.

At S307, no CAN message is received, that is, CANLOSS, the method proceeds to S308.

At S308, it is determined whether the ENABLE signal is a high-level signal. If the determination result is positive, it is determined that the vehicle is in the power-off state; if the determination result is negative, it is determined that the vehicle is in the fault state.

Based on the same application concept, in addition to providing the control method, the embodiments of the present application further provide a corresponding DCDC converter.

The apparatus according to the embodiments of the present application will be described in detail with reference to the drawings.

Figure 4:
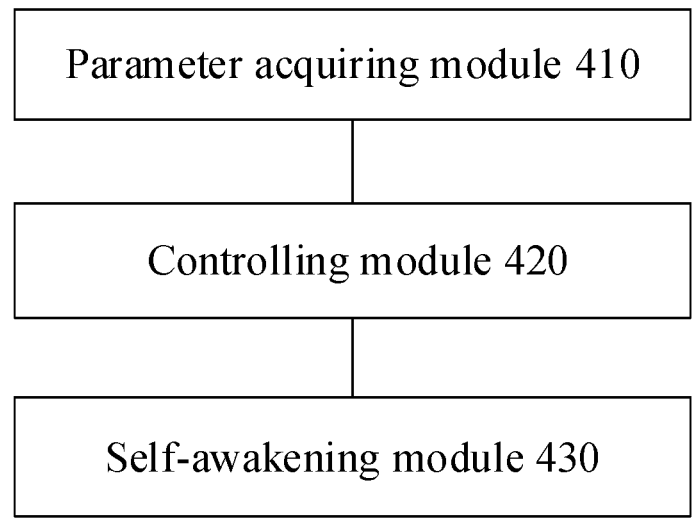
FIG. 4 is a schematic structural diagram of a DCDC converter according to an embodiment of the present application.

The embodiments of the present application provide a DCDC converter. FIG. 4 is a schematic structural diagram of a DCDC converter according to an embodiment of the present application. As shown in FIG. 4, the DCDC converter apparatus includes a parameter acquiring module 410, a controlling module 420, and a self-awakening module 430.

The parameter acquiring module 410 is configured to acquire a charging signal, a vehicle start signal, and an enabling signal.

The control module 420 is configured to determine that a vehicle is in a power-off state and enters a sleep mode when each of the charging signal, the vehicle start signal, and the enabling signal is at a low level, and no communication message sent by a battery management system (BMS) is received.

The self-awakening module 430 is configured to perform self-awakening and output, to the BMS, an awakening signal for awakening the BMS and making the BMS enter a working mode, when a duration of the sleep mode reaches a preset duration.

In some embodiments, the DCDC converter apparatus further includes:
a first outputting module configured to output a first power signal for supplying power to the BMS.

In some embodiments, the DCDC converter apparatus further includes:
a state determining module configured to determine that the vehicle is in a charging state, under a condition that the charging signal is at a high level, when the first communication message is received or the communication message is not received.

In some embodiments, the DCDC converter apparatus further includes:
a second outputting module configured to output a second power signal determined according to power demand of a target power consuming module.

When a low-voltage power supply loop including a low-voltage power supply and the DCDC converter is turned off, the DCDC converter supplies power to the target power consuming module through the second power signal, the target power consuming module includes a low-voltage power consuming component, and the low-voltage power consuming component includes the BMS.

Under a condition that the low-voltage power supply loop is turned on, the target power consuming module includes the low-voltage power supply and the low-voltage power consuming component. When an output voltage of the low-voltage power supply is greater than an output voltage of the DCDC converter, the power demand of the target power consuming module is zero and the second power signal is equal to zero. When the output voltage of the low-voltage power supply is less than or equal to the output voltage of the DCDC converter, the DCDC converter supplies power through the second power signal to the target power consuming module that includes the low-voltage power supply and the low-voltage power consuming component.

In some embodiments, the DCDC converter apparatus further includes:
a state determining module configured to determine that the vehicle is in a traveling state, when the charging signal is at a low level, the vehicle start signal is at a high level, and the first communication message is received, or when the charging signal is at a low level, the vehicle start signal and the enable signal are at a high level, and the communication message is not received.

In some embodiments, the DCDC converter apparatus further includes:
a third outputting module configured to output a third power signal determined according to power demand of a target power consuming module. When a low-voltage power supply loop including a low-voltage power supply and the DCDC converter is turned off, the DCDC converter supplies power to the target power consuming module through the third power signal, the target power consuming module includes a low-voltage power consuming component, and the low-voltage power consuming component includes the BMS.

Under a condition that the low-voltage power supply loop is turned on, the target power consuming module includes the low-voltage power supply and the low-voltage power consuming component. When an output voltage of the low-voltage power supply is less than an output voltage of the DCDC converter, the power demand of the target power consuming module is zero and the third power signal is equal to zero. When the output voltage of the low-voltage power supply is less than or equal to the output voltage of the DCDC converter, the DCDC converter supplies power through the third power signal to the target power consuming module that includes the low-voltage power supply and the low-voltage power consuming component.

In some embodiments, the DCDC converter apparatus further includes:
a state determining module configured to determine that the vehicle is in a standby state, when the first communication message is received and the charging signal and the vehicle start signal are at a high level, or when the second communication message is received.

In some embodiments, the DCDC converter apparatus further includes:
a state determining module configured to determine that the vehicle is in a target state in which the vehicle is waiting to enter the sleep mode, when the first communication message is received and the charging signal and the vehicle start signal are at a low level.

In some embodiments, the DCDC converter apparatus further includes:
a state determining module configured to determine that the vehicle is in a fault state, when no communication message sent by the BMS 12 is received, the charging signal and the vehicle start signal are at a low level, and the enabling signal is at a high level.

In some embodiments, the DCDC converter includes a phase-shifted full-bridge circuit. The embodiments of the present application illustrate an exemplary phase-shifting full-bridge converter (Phase-Shifting Full-Bridge Converter, PSFB) unit with reference to FIG. 5.

Figure 5:
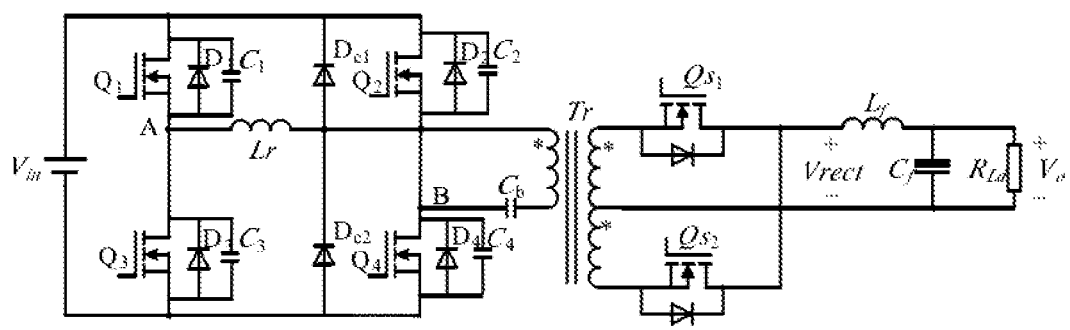
FIG. 5 is a schematic structural diagram of an exemplary phase-shifting full-bridge unit according to an embodiment of the present application.

The circuit in FIG. 5 is the main power topology structure of the DCDC controller provided by the embodiments of the present application. A phase-shifted full bridge (PSFB) is used at the primary side of the DCDC controller. Q1-Q4 are four sic-metal-oxide-semiconductor (SiC-Metal-Oxide-Semi conductor, SiC-MOS) switch tubes. Junction capacitors C1, C2, C3 and C4, a transformer leakage inductance $C_b$, and a resonance inductance Lr are used in Q1-Q4 as resonance elements to turn on and off the four SiC-MOS switch tubes sequentially at zero voltage (ZVS) so as to realize soft switching. The clamp diode Dc1 and clamp diode Dc2 are used to suppress the voltage oscillation of the secondary side, a direct current blocking capacitor Cb is connected in series to suppress the direct current component in the high-frequency transformer primary winding, and the secondary side adopts a full-wave rectification scheme using synchronous rectification technology, which improves the conversion efficiency of the DCDC converter.

With continued reference to FIG. 5, yin is an input direct current power supply. D1-D4 are parasitic diodes or additional freewheeling diodes of the four switch tubes. Tr is a phase-shifted full-bridge power transformer. $Qs_1$ and $Qs_2$ are switch tubes. $L_f$ is a secondary output freewheeling inductor of the phase-shifted full-bridge power supply. $C_f$ is a secondary output capacitance of the phase-shifted full-bridge power supply. $R_{Ld}$ is a secondary load of the phase-shifted full-bridge power supply.

According to the DCDC converter in the embodiments of the present application, when each of the charging signal, the vehicle start signal, and the enable signal is at a low level and no communication message sent by the BMS is received, it can be determined that the vehicle is in a power-off state and enters the sleep mode. When the duration of the sleep mode reaches the preset duration, the self-awakening is performed, and the awakening signal for awakening the BMS and making the BMS enter the working mode is outputted to the BMS. Therefore, the DCDC converter can be used to awaken the battery management system for monitoring the battery pack, so that the safety state of the vehicle can be monitored using the battery management system when the vehicle is powered off, which improves the safety of the battery pack.

In addition, the DCDC converter 11 can be self-awakened and enter the working mode, and there is no need to provide a vehicle DCDC relay between the DCDC and the battery pack, which simplifies the circuit structure.

Other details of the DCDC converter according to the embodiment of the present application are similar to the control method described above in connection with the examples shown in FIG. 1 to FIG. 3 and can achieve the corresponding technical effects, and for the sake of brevity, the description thereof will not be repeated here.

Figure 6:
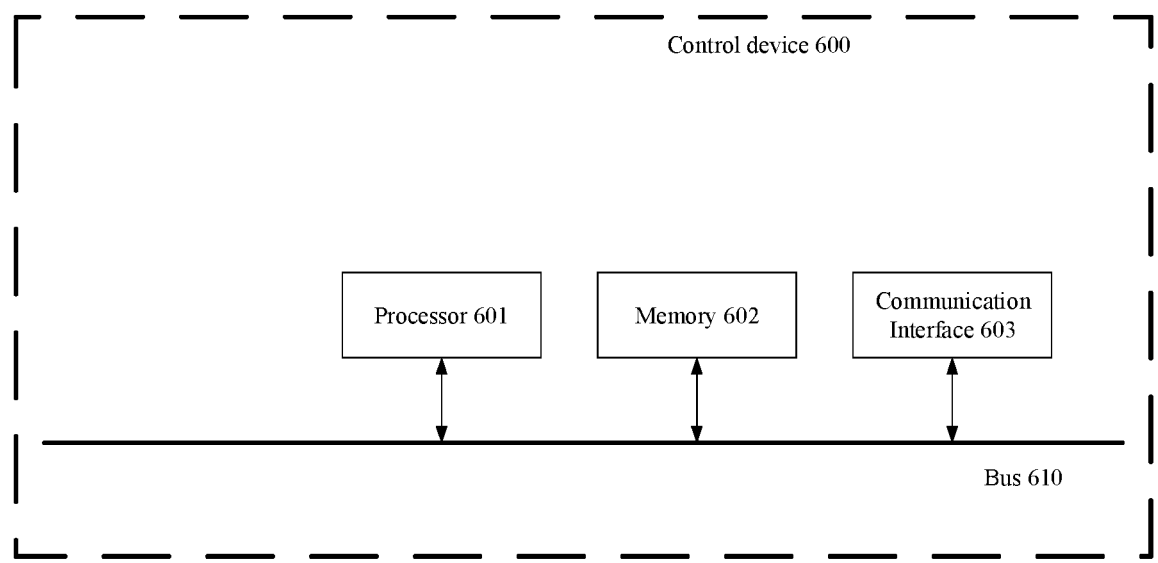
FIG. 6 is a structural diagram of an exemplary hardware architecture of a control device according to an embodiment of the present application.

FIG. 6 illustrates a schematic structural diagram of hardware of a control device according to an embodiment of the present application.

The control device may include a processor 601 and a memory 602 having computer program instructions stored thereon.

Specifically, the above-mentioned processor 601 may include a central processing unit (Central Processing Unit, CPU), or an application specific integrated circuit (Application Specific Integrated Circuit, ASIC), or one or more integrated circuits that may be configured to implement of the embodiments of the present application.

The memory 602 may include a mass memory for data or instructions. For example but not limitation, the memory 602 may include a hard disk drive (Hard Disk Drive, HDD), a floppy disk drive, a flash memory, an optical disk, a magneto-optical disk, a magnetic tape or a universal serial bus (Universal Serial Bus, USB) drive, or a combination of two or more of them. In some examples, the memory 602 may include removable or non-removable (or fixed) media, or the memory 602 may be a non-volatile solid-state memory. In some embodiments, the memory 602 may be internal or external to the control device.

In some examples, the memory 602 may be a read only memory (Read Only Memory, ROM). In an example, the ROM may be a mask-programmed ROM, a programmable ROM (PROM), an erasable PROM (EPROM), an electrically erasable PROM (EEPROM), an electrically rewritable ROM (EAROM) or flash memory, or a combination of two or more of them.

The memory 602 may include a read-only memory (ROM), a random access memory (RAM), a magnetic disk storage media device, an optical storage media devices, a flash memory device, an electrical, optical, or other physical/tangible memory storage device. Therefore, generally, the memory may include one or more tangible (non-transitory) computer-readable storage media (e.g., memory devices) encoded with software including computer-executable instructions, and when the software is executed (e.g., by one or more processors), it is operable to perform operations described with reference to the method according to an aspect of the present disclosure.

The processor 601 reads and executes the computer program instructions stored in the memory 602, to implement the methods in the embodiments shown in FIG. 2 to FIG. 3, and achieve corresponding technical effects achieved when the methods of the embodiments shown in FIG. 2 to FIG. 3 are executed, which will not be repeated here, for concision of the description.

In an example, the control device may further include a communication interface 603 and a bus 610. As shown in FIG. 6, the processor 601, the memory 602, and the communication interface 603 are connected and communicate with one another through the bus 610.

The communication interface 603 is mainly used to implement communications between various modules, apparatuses, units and/or devices in the embodiments of the present application.

The bus 610 may include hardware, software, or both, and couple components of an online data flow accounting device to each other. For example but not limitation, the bus may include an accelerated graphics port (Accelerated Graphics Port, AGP) or other graphics bus, an enhanced industry standard architecture (Extended Industry Standard Architecture, EISA) bus, a front side bus (Front Side Bus, FSB), a hyper transport (Hyper Transport, HT) interconnection, an industry standard architecture (Industry Standard Architecture, ISA) bus, an unlimited bandwidth interconnection, a low pin count (LPC) bus, a memory bus, a microchannel architecture (MCA) bus, a peripheral component interconnection PCI bus, a PCI-Express (PCI-X) bus, a Serial Advanced Technology Attachment (SATA) bus, a Video Electronics Standards Association Local (VLB) bus or other suitable bus or a combination of two or more of them. Where appropriate, the bus 610 may include one or more buses. Although the embodiments of the present application describe and show specific buses, the present application has contemplated any suitable bused or interconnections.

The control device can execute the control method in the embodiment of the present application, so as to realize the control method and control apparatus described in conjunction with FIG. 1 to FIG. 5.

In addition, in combination with the control method, the embodiments of the present application may provide a computer storage medium to implement the method. The computer storage medium has computer program instructions stored thereon. When the computer program instructions are executed by the processor, any control method in the aforementioned embodiment can be implemented.

It should be clarify that the present application is not limited to the specific configurations and process described above and shown in the drawings. For the sake of brevity, a detailed description of known methods is omitted here. In the above embodiments, several specific steps are described and shown as examples. However, the method processes of the present application are not limited to the specific steps described and shown, and those skilled in the art can make various changes, modifications and additions, or change the order between the steps after understanding the gist of the present application.

It should be noted that functional blocks shown in the above-mentioned structural block diagrams may be implemented as hardware, software, firmware, or a combination thereof. When implemented in hardware, they can be, for example, electronic circuits, application specific integrated circuits (ASICs), appropriate firmware, plug-ins, function cards, and so on. When implemented in software, elements of the present application are programs or code segments used to perform required tasks. The programs or code segments may be stored in machine-readable media, or transmitted on transmission media or communication links through data signals carried in carrier waves. "Machine-readable media" may include any media that can store or transmit information. Examples of machine-readable media may include electronic circuits, semiconductor memory devices, ROMs, flash memories, erasable ROMs (EROMs), floppy disks, CD-ROMs, optical disks, hard disks, fiber optic media, radio frequency (Radio Frequency, RF) links, and so on. The code segments can be downloaded via a computer network such as the Internet, an intranet, etc.

It should also be noted that, the exemplary embodiments described in the present application describe some methods or systems based on a series of steps and apparatuses. However, the present application is not limited to the order of the above steps. That is to say, the steps may be executed in the order described in the embodiments or in an order different from that in the embodiments, or several steps may be executed simultaneously.

Various aspects of the present disclosure are described with reference to the flowcharts and/or block diagrams of the methods, apparatuses, devices, and computer program products according to the embodiments of the present disclosure. It should be understood that each block in the flowcharts and/or block diagrams and combinations of blocks in the flowcharts and/or block diagrams can be implemented by computer program instructions. These computer program instructions can be provided to a processor of a general-purpose computer, a special-purpose computer, or other programmable data processing apparatus, to produce a machine that causes these instructions executed by the processor of the computer or other programmable data processing apparatus to enable the implementation of the functions/actions specified in one or more blocks of the flowcharts and/or block diagrams. Such processor may be, but is not limited to, a general-purpose processor, a dedicated processor, a special application processor, or a field programmable logic circuit. It can also be understood that each block in the block diagrams and/or flowcharts and a combination of the blocks in the block diagrams and/or flowcharts may be implemented by dedicated hardware that performs specified functions or actions, or may be implemented by a combination of the dedicated hardware and the computer instructions.

The above embodiments are only specific implementations of the present application. Those skilled in the art can clearly understand that, for convenience and conciseness of the description, specific working processes of the above-described systems, modules and units may refer to corresponding processes in the foregoing method embodiments, which will not be repeated here. It should be understood that the protection scope of the present application is not limited to this. Any person skilled in the art can easily conceive of equivalent changes or substitutions within the technical scope disclosed in the present application, which should be covered within the protection scope of the present application.

What is claimed is:

1. A control method applied to a direct current DCDC converter, comprising:
    acquiring (S210) a charging signal;
    acquiring (S220) a vehicle start signal;
    acquiring (S230) an enabling signal;
    when each of the charging signal, the vehicle start signal, and the enabling signal is at a low level, and no communication message sent by a battery management system, BMS, is received, determining (S240) that a vehicle is in a power-off state and enters a sleep mode;
    when a duration of the sleep mode reaches a preset duration, performing (S250) self-awakening, and outputting, to the BMS, an awakening signal for awakening the BMS and making the BMS enter a working mode; and
    the control method is characterized in that:
    the communication message comprises a first communication message allowing output from the DCDC converter and a second communication message prohibiting output from the DCDC converter, and the control method further comprises:
    when the charging signal is at a low level, the vehicle start signal is at a high level, and the first communication message is received, or when the charging signal is at a low level, the vehicle start signal and the enable signal are at a high level, and the communication message is not received, determining that the vehicle is in a traveling state; and
    under a condition that the vehicle is determined in the traveling state, outputting a third power signal, the third power signal being determined according to power demand of a target power consuming module and configured to supply power to the target power consuming module;
    wherein when a low-voltage power supply loop for connecting a low-voltage power supply and the DCDC converter is turned off, the DCDC converter supplies power to the target power consuming module through the third power signal, the target power consuming module comprises a low-voltage power consuming component, and the low-voltage power consuming component comprises the BMS;
    wherein under a condition that the low-voltage power supply loop is turned on, when an output voltage of the low-voltage power supply is greater than an output voltage of the DCDC converter, the power demand of the target power consuming module is zero and the third power signal is equal to zero, and when the output voltage of the low-voltage power supply is less than or equal to the output voltage of the DCDC converter, the DCDC converter supplies power to the target power consuming module through the third power signal and the target power consuming module comprises the low-voltage power supply and the low-voltage power consuming component.

2. The control method according to claim 1, wherein after the when a duration of the sleep mode reaches a preset duration, performing self-awakening, the control method further comprises:
    outputting a first power signal, and the first power signal being for supplying power to the BMS.

3. The control method according to claim 1, wherein the control method further comprises:
    under a condition that the charging signal is at a high level, when the first communication message is received or the communication message is not received, determining that the vehicle is in a charging state.

4. The control method according to claim 3, wherein after the determining that the vehicle is in a charging state, the control method further comprises:
    outputting a second power signal, the second power signal being determined according to power demand of a target power consuming module and configured to supply power to the target power consuming module;
    wherein when a low-voltage power supply loop for connecting a low-voltage power supply and the DCDC converter is turned off, the DCDC converter supplies power to the target power consuming module through the second power signal, the target power consuming module comprises a low-voltage power consuming component, and the low-voltage power consuming component comprises the BMS;
    wherein under a condition that the low-voltage power supply loop is turned on, when an output voltage of the low-voltage power supply is greater than an output voltage of the DCDC converter, the power demand of the target power consuming module is zero and the second power signal is equal to zero, and when the output voltage of the low-voltage power supply is less than or equal to the output voltage of the DCDC converter, the DCDC converter supplies power to the target power consuming module through the second power signal and the target power consuming module comprises the low-voltage power supply and the low-voltage power consuming component.

5. The control method according to claim 1, wherein the control method further comprises:
    when the first communication message is received and the charging signal and the vehicle start signal are at a high level, or when the second communication message is received, determining that the vehicle is in a standby state.

6. The control method according to claim 1, wherein the control method further comprises:
    when the first communication message is received and the charging signal and the vehicle start signal are at a low level, determining that the vehicle is in a target state in which the vehicle is waiting to enter the sleep mode.

7. The control method according to claim 1, wherein the control method further comprises:

when no communication message sent by the BMS is received, the charging signal and the vehicle start signal are at a low level, and the enabling signal is at a high level, determining that the vehicle is in a fault state.

8. A DCDC converter, comprising:
a parameter acquiring module (410) configured to acquire (S210, S220, S230) a charging signal, a vehicle start signal, and an enabling signal;
a control module (420) configured to determine (S240) that a vehicle is in a power-off state and enters a sleep mode when each of the charging signal, the vehicle start signal, and the enabling signal is at a low level, and no communication message sent by a battery management system, BMS, is received;
a self-awakening module (430) configured to perform (S250) self-awakening and output, to the BMS, an awakening signal for awakening the BMS and making the BMS enter a working mode, when a duration of the sleep mode reaches a preset duration; and
the DCDC converter is characterized in that:
the communication message comprises a first communication message allowing output from the DCDC converter and a second communication message prohibiting output from the DCDC converter, and the DCDC converter further comprises:
a state determining module configured to determine that the vehicle is in a traveling state, when the charging signal is at a low level, the vehicle start signal is at a high level, and the first communication message is received, or when the charging signal is at a low level, the vehicle start signal and the enable signal are at a high level, and the communication message is not received; and
a third outputting module configured to, under a condition that the vehicle is determined in the traveling state, output a third power signal, the third power signal being determined according to power demand of a target power consuming module and configured to supply power to the target power consuming module;
wherein when a low-voltage power supply loop for connecting a low-voltage power supply and the DCDC converter is turned off, the DCDC converter supplies power to the target power consuming module through the third power signal, the target power consuming module comprises a low-voltage power consuming component, and the low-voltage power consuming component comprises the BMS;
wherein under a condition that the low-voltage power supply loop is turned on, when an output voltage of the low-voltage power supply is greater than an output voltage of the DCDC converter, the power demand of the target power consuming module is zero and the third power signal is equal to zero, and when the output voltage of the low-voltage power supply is less than or equal to the output voltage of the DCDC converter, the DCDC converter supplies power to the target power consuming module through the third power signal and the target power consuming module comprises the low-voltage power supply and the low-voltage power consuming component.

9. The DCDC converter according to claim 8, wherein the DCDC converter comprises a phase-shifted full-bridge unit.

10. A low-voltage power transmission system, characterized by comprising:
a battery management system and the DCDC converter according to claim 8.

11. The low-voltage power transmission system according to claim 10, wherein:
the low-voltage power supply is connected to the DCDC inverter and the battery management system each through the low-voltage power supply loop.

12. The low-voltage power transmission system according to claim 11, further comprising:
a state parameter transmitting apparatus configured to acquire a state parameter of a battery pack from the battery management system, and transmit the state parameter of the battery pack to a remote monitoring platform.

13. A non-transitory computer storage medium having computer program instructions stored thereon, wherein the computer program instructions, when being executed by a processor of a control device for a DCDC converter, implement the control method according to claim 1.

* * * * *